UNITED STATES PATENT OFFICE.

CHARLES C. BARNES, OF NORRISTOWN, PENNSYLVANIA.

PROCESS OF MAKING DECOLORIZING CHARCOAL AND FILTERING COMPOUNDS.

SPECIFICATION forming part of Letters Patent No. 686,248, dated November 12, 1901.

Application filed June 5, 1901. Serial No. 63,235. (No specimens.)

*To all whom it may concern:*

Be it known that I, CHARLES C. BARNES, a citizen of the United States, and a resident of Norristown, State of Pennsylvania, have invented a certain new and useful Process of Making Decolorizing Charcoal and Filtering Compounds, of which the following is a full, clear, and exact specification.

My invention relates to an improved decolorizing agent and the process of making the same.

The main object of the invention is to produce a decolorizing agent which may be manufactured at a greatly-reduced cost to those now in use, while the decolorizing and filtering properties of the same are equal to anything heretofore used and are quicker in its action.

Heretofore what is known as "bone-black" has been almost exclusively used for depriving various solutions of their organic coloring-matters, and as this is a very expensive product I have provided a substitute which is in the same form as bone-black and is used in substantially the same manner and which also possesses superior decolorizing and filtering properties and is capable of revivification in the same manner as the bone-black.

In the course of numerous experiments I have found that certain clays when intimately mixed with nitrogenous animal, vegetable, or mineral matters and burned, when excluded or partially excluded from air, will form a nitrogenous char having the same properties of decolorizing solutions containing organic coloring-matter or of purifying liquids containing albuminous matter as bone-black or animal charcoal. I have also found that after certain treatment my improved product possesses the same physical properties necessary for its use and revivification as bone-black.

In carrying out my process I take clay, which may be of any variety, although some are better adapted to the purpose than others, and grind the same finely with nitrogenous animal, vegetable, or mineral matters—such as horn, hide, hair, hoofs, glue, proteins generally, nitrates, nitrites, ammonia salts, &c.—and then mix with an additional carbonaceous matter, such as solutions of glucose and solutions of tar. The material is then mixed with water and placed in a horizontal pug-mill, where it is thoroughly pugged, so as to reduce it to a plastic state. It is then passed into a closed pug and brick machine and formed into clots or bricks of about the size of ordinary building-bricks. These clots or bricks are now placed in drying-ovens, where they are thoroughly dried, and afterward placed in saggars, such as are used by potters. The bricks in the saggars are covered with hard-coal dust, charcoal, ashes, burned clay, or some other like material, which serves to exclude the air from the bricks. The saggars are then placed in kilns and heated up to a very high temperature—say about from 2,000° to 2,400° Fahrenheit. The bricks are allowed to remain in the kilns until the proper texture has been produced in the burned mass, which is ordinarily from two to three days. The heating process carbonizes the nitrogenous matter in the interstices of the clay, and the clay acts as a base or carrier for supporting the same. The kilns are then cooled and the bricks withdrawn from the saggars and conveyed to the crushing-rolls, where they are broken up in fine particles and afterward sieved to the required fineness for use. The material is then washed to remove the fine dust and dried and is then ready for use or sale.

Instead of using clay as a base I might use some other material—such, for instance, as phosphate of lime. This would be suitable for decolorizing oils, but would not be suitable for sugars, syrups, &c., by reason of its lacking proper physical texture.

The material or product obtained by the above-described process resembles bone-black very closely and contains all the essential properties as a decolorizing and purifying agent as bone-black and is quicker in its action and can be manufactured for considerably less than the cost of bone-black.

I do not wish to be limited to the particular details as above set forth, as various slight changes may be made without departing from the spirit and scope of my invention.

Having thus described my invention, what I claim, and desire to secure by Letters Patent, is—

1. The herein-described process of forming decolorizing and purifying compounds consisting in comminuting and mechanically mixing a suitable base or carrier with nitrogenous matter and burning the two in a receptacle from which oxygen is practically excluded, substantially as described.

2. The herein-described process of forming decolorizing and purifying compounds consisting in grinding a suitable base or carrier with nitrogenous vegetable matter and burning the two in a receptacle from which oxygen is practically excluded, substantially as described.

3. The process herein described of making decolorizing and purifying compounds consisting in grinding and mixing a suitable unbaked clay with ground nitrogenous matter and burning the two while practically excluded from the presence of oxygen, substantially as described.

4. The herein-described process of producing decolorizing and purifying compounds consisting in comminuting and mixing mechanically a suitable unbaked clay with nitrogenous char and burning the same in a vacuum or partial vacuum for the purpose set forth.

5. A decolorizing and purifying compound comprising a base or carrier of ground porous material, a ground nitrogenous matter incorporated with the base and carbonized and charred in said base substantially as described.

6. A decolorizing and purifying compound comprising a base or carrier of ground clay, ground nitrogenous matter finely comminuted and mixed mechanically with the clay, the clay and the nitrogenous matter being carbonized and charred, substantially as described.

7. In a decolorizing filtering and purifying compound, the combination, a base consisting of porous burned clay, having incorporated in its interstices charred nitrogenous matter, animal, vegetable or mineral and carbonaceous matter to form a homogeneous mass, the whole being granulated or reduced to small particles, for the purpose substantially as described.

8. A decolorizing and purifying compound consisting of a base of ground porous material and nitrogenous carbonaceous matter finely comminuted and mixed mechanically, the nitrogenous matter being carbonized and charred in said base and the compound broken into small particles in a manner substantially as described.

9. The herein-described process of forming decolorizing and purifying charcoal consisting in grinding a suitable base or carrier with nitrogenous matters, animal, vegetable or mineral, reducing the same to a plastic state by pugging, forming the same into clots or bricks, heating the same *in vacuo* at a high temperature and then reducing the said bricks to the required fineness by crushing and sieving, substantially as described.

10. The herein-described process of forming decolorizing and purifying charcoal, consisting in grinding a base of porous material with nitrogenous matter, adding carbonaceous matter, then mixing with water in a pugging-machine reducing to a plastic state, forming into clots or bricks, drying the same, placing the bricks in saggars and covering the same with a material so as to form a partial vacuum, placing the same in kilns and heating to a high temperature, then cooling the bricks and crushing and sieving to the required fineness for use, as set forth.

In witness whereof I have hereunto set my hand this 1st day of June, A. D. 1901.

CHARLES C. BARNES.

Witnesses:
W. C. MORILLAT,
CHARLES F. CLOUD.